(12) United States Patent
Hurwitz

(10) Patent No.: US 6,205,457 B1
(45) Date of Patent: Mar. 20, 2001

(54) ORDERED OLE FILE STRUCTURE

(75) Inventor: Roger A. Hurwitz, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/102,720

(22) Filed: Jun. 22, 1998

(51) Int. Cl.[7] .................................................. G06F 17/30
(52) U.S. Cl. .............................. 707/703; 707/1; 707/7; 707/102; 707/104; 707/200
(58) Field of Search ........................ 707/1, 100, 102, 707/103, 104, 205, 7, 200; 358/442; 395/835, 701, 680

(56) References Cited

U.S. PATENT DOCUMENTS

| | | | |
|---|---|---|---|
| 5,678,046 | * 10/1997 | Cahill et al. | 395/616 |
| 5,760,770 | * 6/1998 | Bliss et al. | 345/335 |
| 5,760,917 | * 6/1998 | Sheridan | 358/442 |
| 5,761,499 | * 6/1998 | Sonderegger | 395/610 |
| 5,848,273 | * 12/1998 | Fontana et al. | 395/701 |
| 5,896,533 | * 4/1999 | Ramos et al. | 395/680 |
| 5,924,009 | * 7/1999 | Guzak et al. | 707/100 |
| 5,926,635 | * 7/1999 | Hsueh et al. | 395/680 |
| 5,960,214 | * 9/1999 | Shape, Jr. et al. | 3995/835 |
| 5,970,496 | * 10/1999 | Katzenberger | 707/102 |
| 6,035,301 | * 3/2000 | Siegel et al. | 707/102 |
| 6,094,684 | * 7/2000 | Pallmann | 709/277 |

* cited by examiner

Primary Examiner—Thomas Black
Assistant Examiner—Thuy Do
(74) Attorney, Agent, or Firm—Trop, Pruner & Hu, P.C.

(57) ABSTRACT

An ordered object linking and embedding (OOLE) file is a valid object linking and embedding (OLE) file whose sectors are placed in a predetermined order. If the OOLE file is an image file, it may be used to provide progressive viewing capability during streaming type transfers. One example streaming type transfer protocol is the hypertext transfer protocol.

30 Claims, 7 Drawing Sheets

ORDERED OLE FILE STRUCTURE

BACKGROUND

The invention relates generally to formatting an object linking and embedding file so that the file can provide progressive viewing during file transfer operations.

Object embedding and linking (OLE, pronounced oh-lay) technology allows a user to "embed" or "link" different types of objects (e.g., text and graphic objects) into a common document. An embedded/linked object retains the data format of the application used to create it. In addition, the common document incorporates information about the format such as what application should be executed to view the embedded object.

The basic OLE concept has been extended through the definition of a structured storage model that treats a single file system entity as a structured collection of two types of objects; streams and storages. A stream object is the conceptual equivalent of a single disk file. Streams are the basic file system component in which data persists and are treated as a flat sequence of bytes (each stream has access rights and a single seek pointer). A storage object is the conceptual equivalent of a directory. Each structured storage file, referred to as a compound file, may contain any number of substorages and any number of streams.

One embodiment of the OLE structured storage model, targeted specifically for image data, is the FLASHPIX format. (See "The FlashPix Format Specification," version 1.0.1, July 1997.) FLASHPIX is a multi-resolution image format in which an image is stored as a series (hierarchy) of independent arrays, each array representing the image at a different spatial resolution. The hierarchy is created by starting with the highest resolution image, generally determined by the resolution of the image's capture device. Each successive image's resolution is reduced (decimated) by a factor of two in both the height and width until the final resolution fits within a 64-by-64 pixel area. As with all compound files, FLASHPIX files contain storages and streams. Allocation of space within a file for each of these elements is done in units called "sectors." The size of a sector may be specified at file creation time and is often 512 bytes. OLE compound files are organized into a series of logical components, each component being one or more sectors in length. After briefly describing some of these components, an example will be provided that shows how they are interrelated.

Referring to FIG. 1, logical components can include header 100, directory 102, file allocation table (FAT) 104, data 106, and metadata 108. Header 100 contains information vital to the identification and use of the OLE compound file including, for example, data specifying the size of a sector, and references to the first sector of directory 102 and FAT 104. There is one header in any compound file, and it is always begins at a file offset of zero. Directory 102 includes a reference to the first data sector for each stream in the OLE compound file. For example, if the OLE compound file is a FLASHPIX file having four images (one high resolution image and three lower resolution images), directory 102 will have a reference to the first data sector for each of the four images. FAT 104 is the primary space allocation table in an OLE compound file. Every sector in an OLE compound file is represented within FAT 104 in some fashion, including those sectors that are unallocated (free). Each entry in FAT 104 contains a reference to the next sector in an object's (e.g., an image's) chain of data sectors. Those FAT entries associated with the last data sector of an object contain a special end-of-chain value. (Directory 102 is represented as a standard chain of sectors within a FAT, but is separated here for logical clarity.) Data 106 includes one or more sectors associated with each user stream such as a FLASHPIX image. Within a stream, the information stored in data 106 is a sequence of arbitrary bytes; no restrictions are imposed on its content. Metadata 108 represents one or more sectors of user (e.g., application) defined information. Examples of metadata include the time and date a file was created and file author information.

Referring now to FIG. 2, consider a FLASHPIX file having two images—a high resolution image and a low resolution image. As required by the FLASHPIX specification, Header 100 includes information identifying the file as a FLASHPIX file 200 and a reference to the compound file's directory 202. Directory 102 includes references to the first sector associated with the compound file's metadata 204, low resolution (LOWRES) image data 206, and high resolution (HIRES) image data 208. High resolution image data reference 208 indicates the first data sector 210 in data component 106 associated with the high resolution image. The corresponding FAT entry 212 contains a reference to the image's next data sector 214, and so on until the last data sector 222 of the high resolution image is linked. The FAT entry 224 corresponding to the last data sector 222 contains a special end-of-chain value (EOC). A similar chain of data sectors and FAT entries exist for the low resolution images (a two data sector—226 and 228—stream) and the metadata (a one data sector—230—stream). In accordance with the FLASHPIX specification, all file components (e.g., FAT 104 and data 106) except header 100 may be located at any position in the file; header 100 must begin at file offset zero.

As long as a FLASHPIX file is resident on a local computer, the display of any one of the file's available resolutions can be fast. If the FLASHPIX file of FIG. 2 were to be transferred from a first computer system (e.g., a website) to a second computer system (e.g., an individual user's computer) using a standard browser executing the hypertext transport protocol (HTTP), however, it would not be possible for the user to view any of the file's images until the entire file was transferred. If the high resolution image is large, say more than one megabyte, the time required to complete a transfer can make use of FLASHPIX files unacceptable for many users. (The time to transfer an image is exacerbated by the fact that FLASHPIX files are 33% larger than the original, high resolution, image due to the lower resolution images included therein.) This "download time" constraint has become more and more significant with the increased use of computer networks (e.g., the internet and intranets) to access information.

The internet imaging protocol (IIP) was developed to provide access to FLASHPIX file images over computer networks. For example, one benefit of the IIP is that it can provide a progressive view of a file during the download process. Thus, the user does not have to wait until the entire FLASHPIX file is downloaded before they begin to see an image. This capability is similar, from the user's point of view, to the familiar progressive joint photographic experts group (JPEG) download mechanism. To obtain this benefit, however, a user must have access to a server-side executable (i.e., an IIP server application) capable of parsing and selectively transmitting any one of the images within a FLASHPIX file. Because IIP servers are not available to the typical user, who generally connects to the internet via local telephone lines, there is a need for a mechanism to allow progressive viewing of OLE structured files that does not require server side processing.

SUMMARY

In one aspect the invention provides a method to order an object linking and embedding file by locating a stream in the file, the stream being associated with a plurality of sectors having a predetermined sequential order, the sectors not in the predetermined sequential order, and placing the sectors of the stream in the predetermined sequential order. The ordered file may retain the structure of a standard object linking and embedding (OLE) file. The method may further include ordering a plurality of streams in an OLE file, where each stream has an ordering relation to the other streams, such that the sectors of each stream are placed into their predetermined sequential order and each stream is placed in an order consistent with its ordering relation.

In one embodiment, the ordered streams are placed such that they immediately follow the ordered file's header component. In another embodiment a sentinel record, including information about the ordered streams, is placed immediately following the file's header component and immediately before the ordered streams. In another aspect, the invention provides a method for processing ordered OLE files to provide progressive viewing capability while transferring files via a byte streaming process such as the hypertext transfer protocol. Method aspects of the invention my be embodied in one or more computer programs and stored in any media readable by a computer system.

DETAILED DESCRIPTION

Progressive viewing of object linking and embedded (OLE) compound files during data transfer operations may be provided without a server-side application program. The following embodiments of this inventive concept are illustrative only and are not to be considered limiting in any respect.

Byte level streaming protocols such as the hypertext transfer protocol (HTTP) transfer a file from one location to another by sequentially transmitting the file's contents. That is, a file's first byte is transmitted, followed by its second byte, followed by its third byte, and so on until the entire file has been transferred. Except for the header component (which must begin at file offset zero), the arrangement of a FLASHPIX file's components is arbitrary. Thus, a FLASHPIX file transferred over a computer network via a streaming protocol cannot generally provide progressive viewing of the downloaded image(s). First, there is no guarantee that a FLASHPIX file's individual images will be sent in a low resolution to high resolution order (needed to implement progressive viewing). Second, there is no guarantee that data sectors making up a single image are sequentially ordered in the file. Third, there is no guarantee that image data will be sent before other non-image data such as the file allocation table (FAT).

Figure 3:
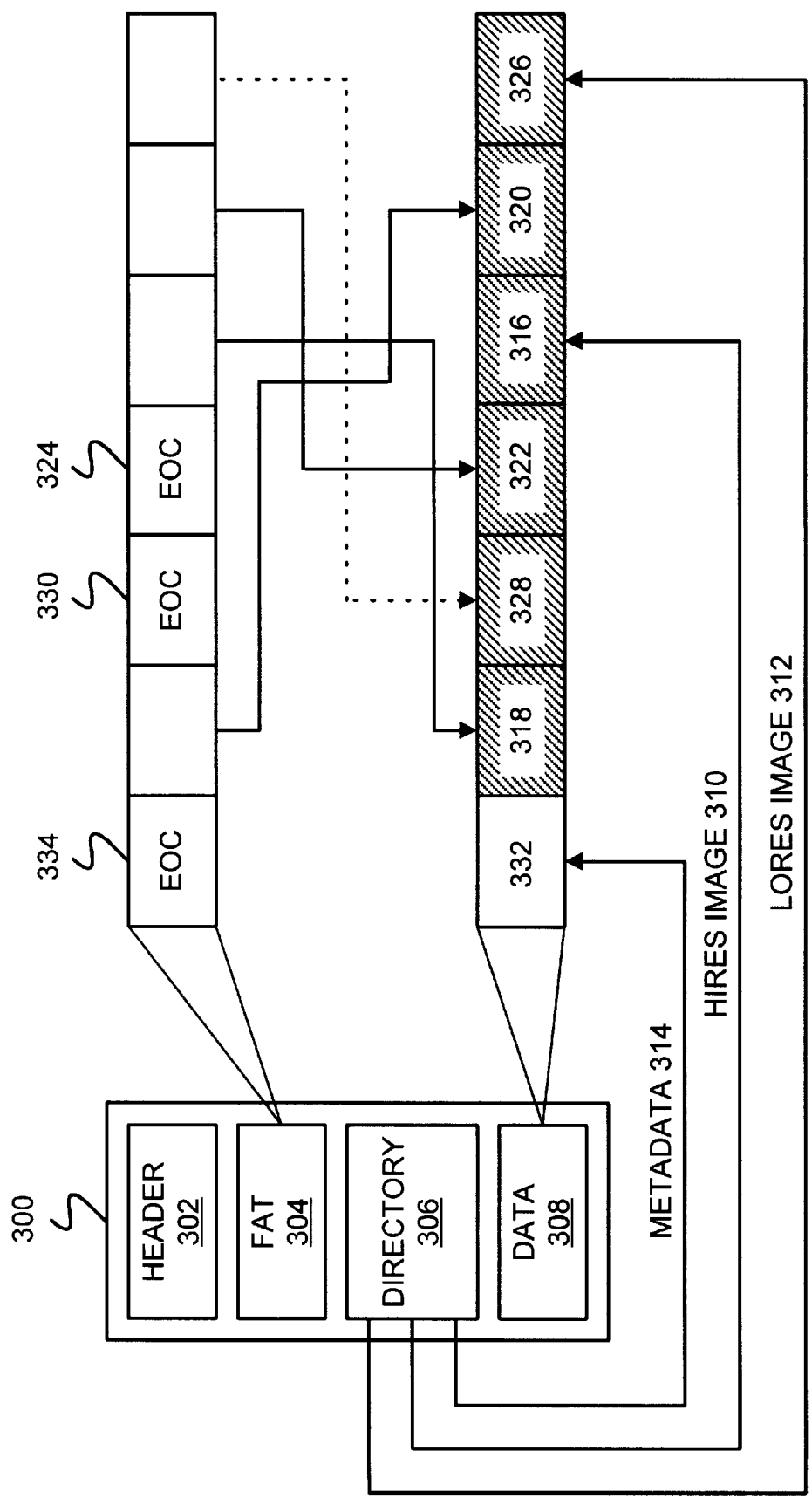
FIG. 3 shows another illustrative FLASHPIX file having two image streams.

Referring to FIG. 3, consider a FLASHPIX formatted OLE file 300 whose header 302 component is immediately followed by its FAT 304, which is immediately followed by its directory 306, which is immediately followed by its data 308. Assume that file 302 includes three streams: high resolution (HIRES) image stream 310; low resolution (LORES) image stream 312; and metadata stream 314. Let the high resolution image include data sectors 316, 318, 320, and 322, and having an end-of-chain (EOC) FAT entry 324. Let the low resolution image include data sectors 326; and 328, and having EOC FAT entry 330. Finally, let metadata comprise data sector 332; and having EOC FAT entry 334.

Figure 1:
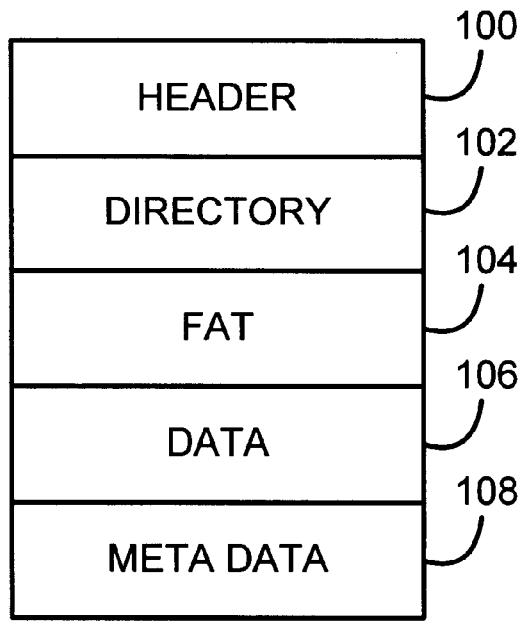
FIG. 1 shows the structure of an object linking and embedded (OLE) compound file.
Figure 5:
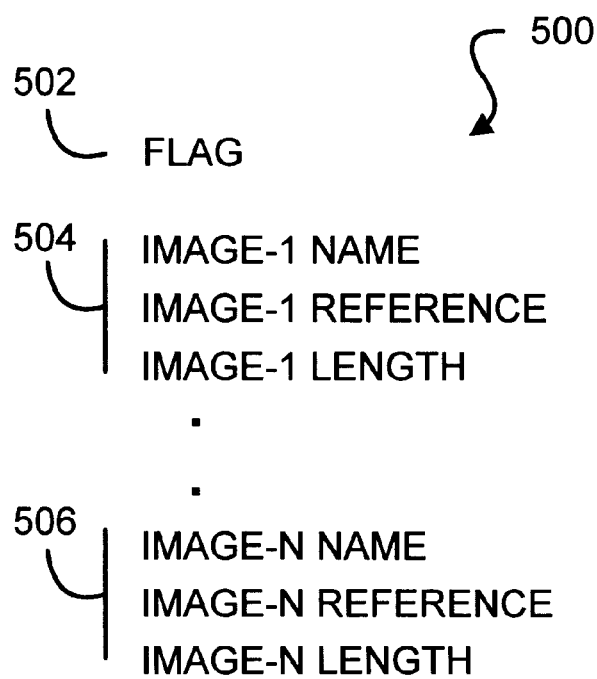
FIG. 5 shows an illustrative sentinel record.
Figure 2:
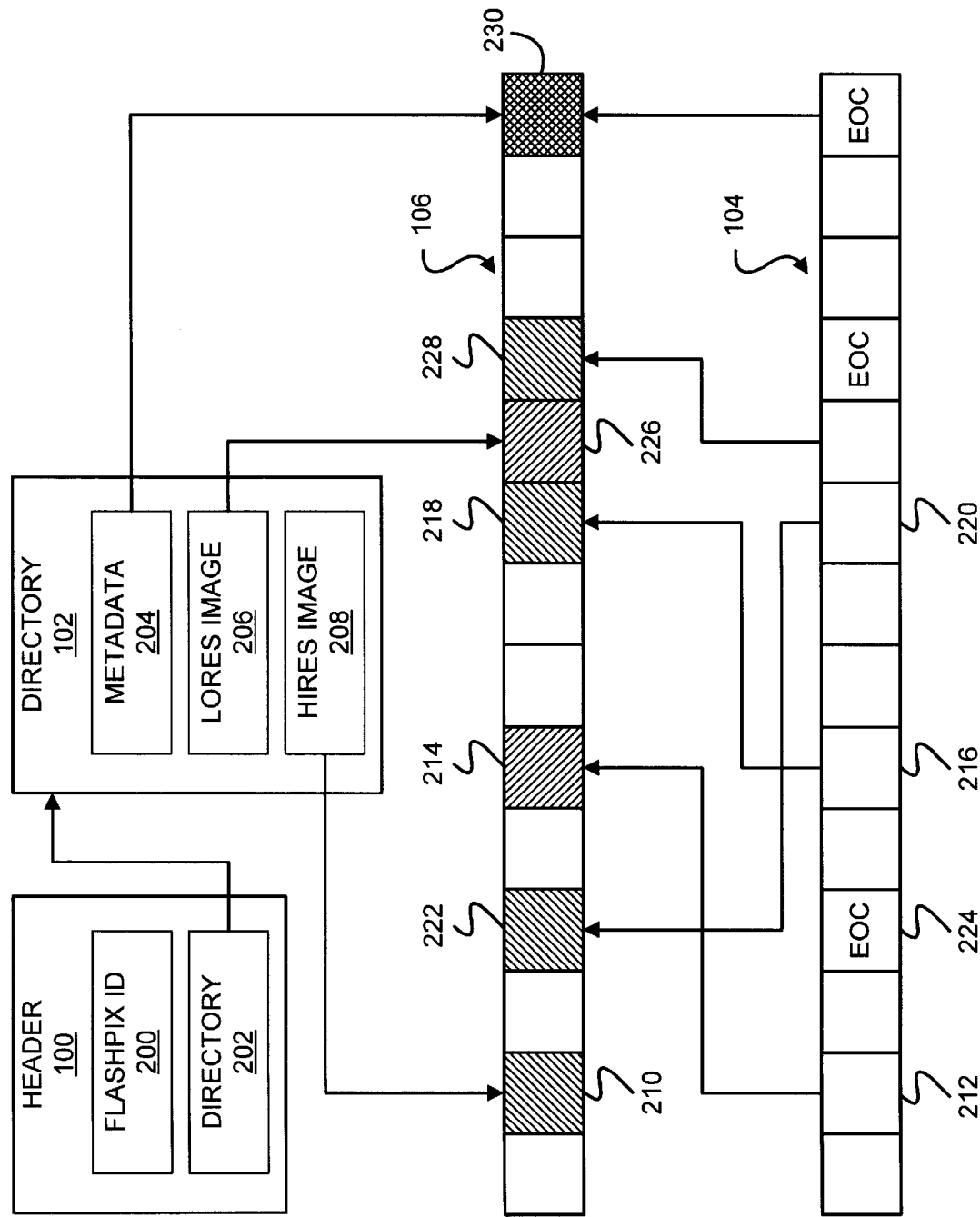
FIG. 2 shows the structure of an illustrative FLASHPIX file.
Figure 4:
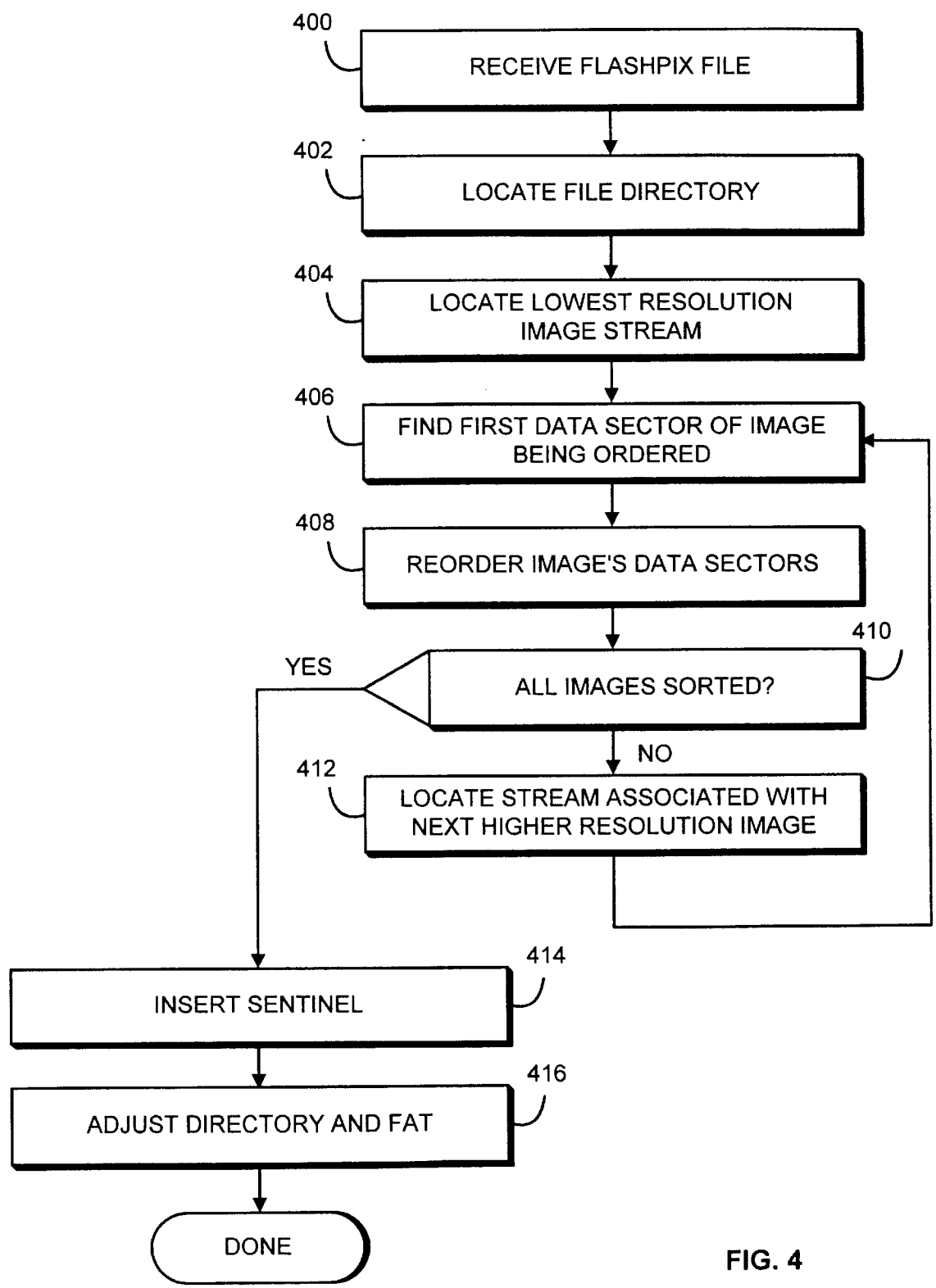
FIG. 4 shows one method to convert a standard OLE file to an ordered OLE (OOLE) file in accordance with one embodiment of the invention.

An illustrative process for converting FLASHPIX formatted file 300 into an ordered OLE (OOLE, pronounced oo-lay) FLASHPIX file is shown in FIG. 4. FLASHPIX file 300 is received (step 400) and its header 302 is interrogated to locate the file's directory 306 (step 402). From directory 306, the number and type of streams can be determined. In particular, the stream associated with the lowest resolution image 312 is identified (step 404), and the first data sector 326 associated with that image is located in the file's data 308 component (step 406). In step 408, the chain of data sectors making up the low resolution image (326 and 328) is reordered so that they are sequential and located immediately following header 302. During this process, header 302, FAT 304, and directory 306 are updated to reflect the changed order of data sectors within file 300. If images remain to be ordered (the 'yes' prong of step 410), the next higher resolution image stream is located (step 412), and processing continues at step 406. If no images remain to be ordered (the 'no' prong of step 410), a sentinel record is created and inserted before any data sectors, i.e., immediately following header 302 (step 414). In one embodiment the sentinel record is metadata and is used to store information about the OOLE file. In an alternative embodiment, the sentinel may be an OLE stream. The sentinel record may be used by an application to provide progressive viewing during streaming type transfer operations (see discussion below). After inserting the sentinel record, the file's header 302, FAT 304, and directory 306 are updated to reflect the file's new organization (step 416). Referring to FIG. 5, an illustrative sentinel record 500 is shown and includes a unique identifier or flag 502, and image reference information for each image in the file (502 and 504). Flag 502 can be a unique byte pattern that, when detected, identifies a file as an OOLE file.

OLE file 300 may be reordered (e.g., step 408) using temporary memory so that the resulting OOLE file is a modified version of the original. Alternatively, a new file having the necessary information copied from the original (in a different order) may be created. If the first alternative is used, the original file is permanently altered. In the second approach, the original file is not modified, but additional memory space is used for the modified copy.

Figure 6:
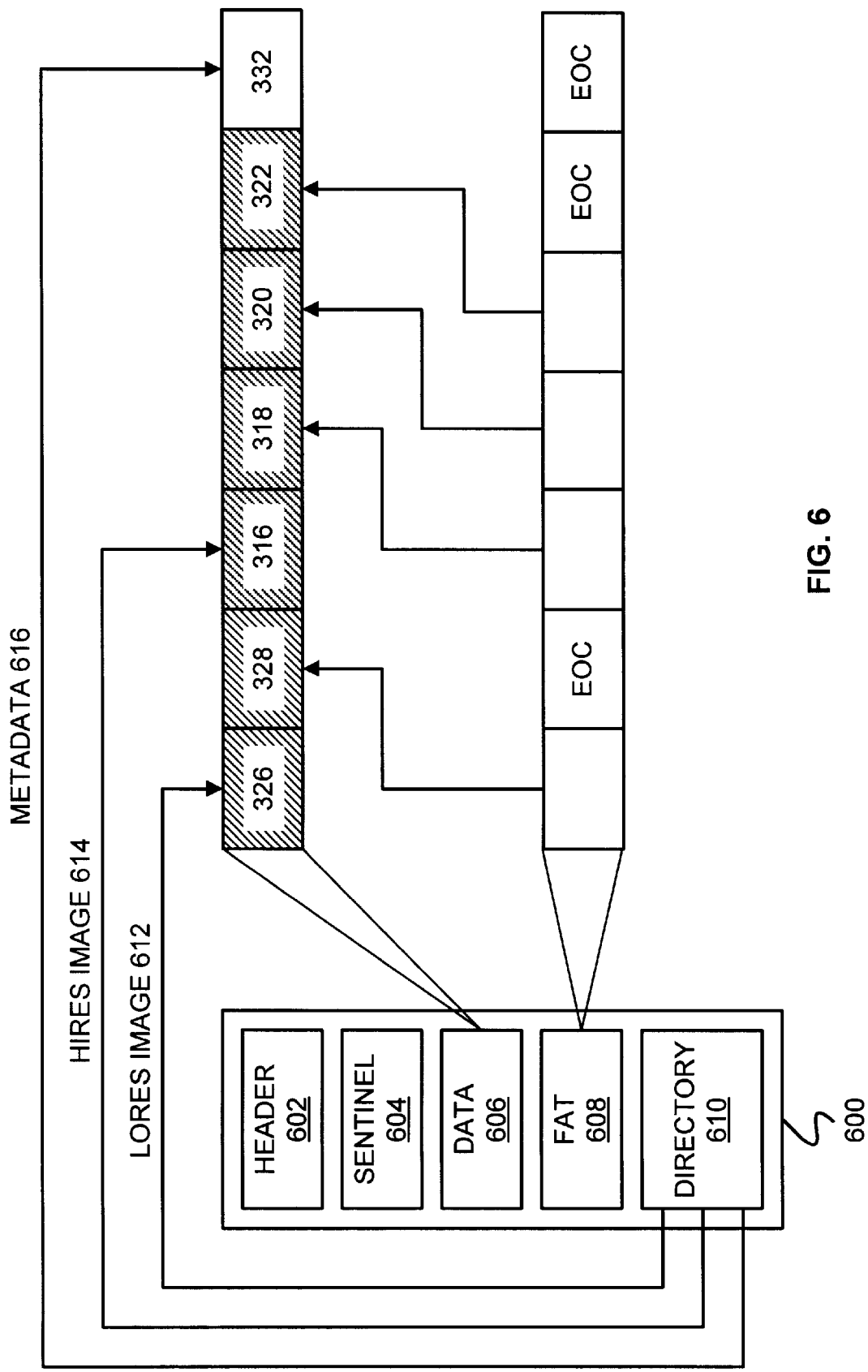
FIG. 6 shows an ordered OLE version of the FLASHPIX file of FIG. 3.

FIG. 6 shows an OOLE version of FLASHPIX file 300 after having been converted in accordance with the method of FIG. 4. As shown, OOLE file 600's header 602 is immediately followed by sentinel 604, which is immediately followed by data 606. Other components, such as FAT 608, directory 610, or any additional components allowed by either the OLE or FLASHPIX specifications, may be arranged in any order after data 606. OOLE file 600 is arranged such that the lowest resolution image 612 is first, and its data sectors are sequential (326 and 328). Successively higher resolution image data is arranged in the same manner, in a low resolution to high resolution progression. Following image data, any other data components (e.g., metadata 616) may be arranged in any order that is convenient.

One aspect of OOLE file 600 is that it remains a valid OLE FLASHPIX formatted file. Any application that can open and/or manipulate an OLE file can open and manipulate OOLE file 600. Another aspect of OOLE file 600 is that, because its image data is sequentially ordered, progressive viewing of the file's images, as they are transferred via a streaming type transfer protocol, may be provided. Progressive viewing is possible because an OOLE formatted file guarantees that all those bytes (data) associated with the lowest resolution image are transferred first, followed by all those bytes associated with the next higher resolution image, and so on. Thus, a low resolution image may be viewed as soon as it is received and while the next higher resolution image is being transferred.

Figure 7:
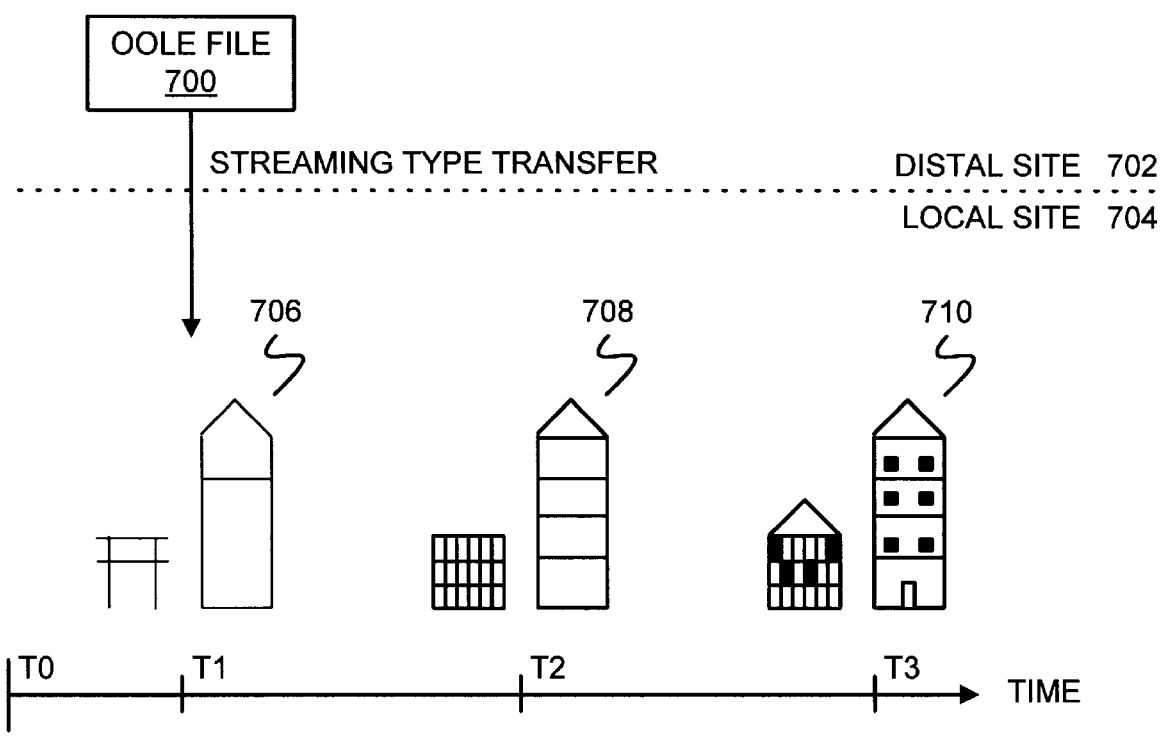
FIG. 7 shows the transfer of an OOLE formatted FLASHPIX image file.

Referring to FIG. 7, OOLE file 700, stored at a distal site 702 (e.g., a remote website), is transferred to a local site 704 (e.g., a user's personal computer executing a browser type application) via a streaming type transfer beginning at time T0. At time T1 file 700's lowest resolution image 706 has been transferred to local site 704 and may be displayed. At time T2 file 700's next higher resolution image 708 has been transferred and may be displayed. At time T3 file 700's highest resolution image 710 has been transferred and may be displayed. In contrast to the progressive presentation shown in FIG. 7, a streaming type transfer of a standard OLE FLASHPIX file (e.g., file 300) does not result in the user being able to see any figure until the entire file is transferred.

Figure 8:
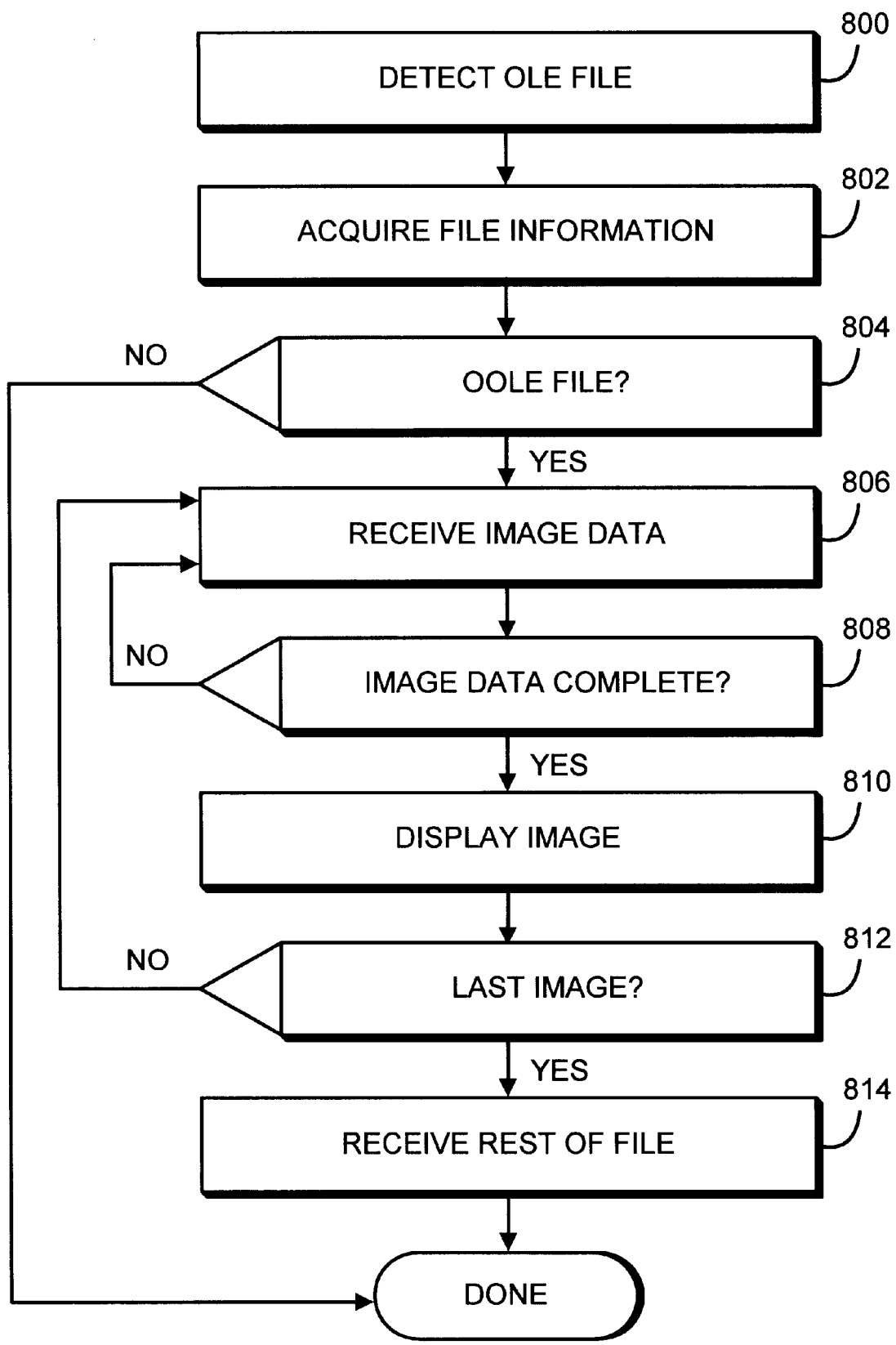
FIG. 8 shows an illustrative method for progressively displaying an OOLE file.

An OOLE file may be identified and progressively displayed by a user application as shown in FIG. 8. As a file begins to be received at a user's computer, the first 512 bytes of an OLE file are required to be its header information. From this information an OLE formatted file may be identified (step 800). The next 'N' bytes of the incoming file are captured (step 802) and interrogated to determine if the received byte pattern indicates the presence of flag 502. (The value of 'N' may be variable. For instance, N could be 4 bytes—the size of flag 502. Alternatively, N could be several thousand bytes, representing a working buffer memory.) If sentinel record 500 (i.e., flag 502) is not present (the 'no' prong of step 804), the progressive OLE viewing method is done. If sentinel record 502 is present (the 'yes' prong of step 804), the lowest resolution image is displayed as soon as it is received (steps 806, 808, and 810). If the most recently displayed image is not the incoming file's last image (the 'no' prong of step 812), the next image data is received and displayed by repeating steps 806, 808, and 810. Information concerning the number of images and the size of each image is provided in the sentinel record. If the most recently displayed image is the file's last image (the 'yes' prong of step 812), the remaining bytes of the file are received as in a normal download process (this includes FAT, directory, and any metadata other than the sentinel that is part of the file). Progressive file downloads in accordance with FIG. 8 can provide a user with almost immediate visual feedback because a FLASHPIX file's lowest resolution image is small (typically 64-by-64 pixels). This is in contrast to a standard OLE file that must transferred in its entirety before a user can view any image (in a streaming type transfer). In one embodiment, a user application in accordance with FIG. 8 can be a world wide web browser plug-in. (The rules and requirements to implement a plug-in are wellknown in the trade and are not described here.) The computer programming language used to implement the method is a matter of choice left to the program designer.

Various changes in the structure of an OOLE file, as well as in the details of the illustrated operational methods are possible without departing from the scope of the claims. For example, some of the image data and/or metadata (e.g., sentinel record) may be stored in minifat type sectors. In addition, an OLE file may contain components other than those discussed herein, such as double-indirect FAT (DIF) sectors. Further, the sentinel record 500 may be replaced with a series of flag streams wherein each flag stream has a unique pattern. A first flag stream pattern could indicate that low resolution image data begins immediately following it (this flag stream may reside immediately after the OOLE file's header). A second flag stream pattern could indicate that data associated with one image is complete but that another image's data follows. A third flag stream pattern could indicate that data associated with a last image is complete. The existence of flag streams would be reflected in the OOLE file's directory and FAT structures and could be processed to provide progressive viewing in a manner described by FIG. 8.

The inventive concept of organizing an OLE compound file so that user data streams are sequentially ordered is not limited to FLASHPIX files. A computer processor (or a custom designed state machine) executing instructions organized into a program module may perform the method steps of FIGS. 4 and 8. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks.

What is claimed is:

1. A method to order an object linking and embedding file comprising:

locating a stream in the file, the stream associated with a plurality of sectors having a predetermined sequential order, the sectors not in the predetermined sequential order; and placing the sectors of the stream in the predetermined sequential order.

2. The method of claim 1, wherein the stream comprises an image stream.

3. The method of claim 1, wherein the object linking and embedding file comprises a FLASHPIX file.

4. The method of claim 1, further comprising updating a directory and a file allocation table of the file to maintain the file as an object linking and embedding file.

5. The method of claim 1, wherein the sectors placed in the predetermined sequential order are further placed in a location immediately after a header of the file.

6. The method of claim 1, wherein the file comprises a plurality of streams, each stream having an ordering relation to the other streams, the method further comprising:

placing the sectors of each stream in their predetermined sequential order; and placing each stream in an order consistent with its ordering relation.

7. A program storage device, readable by a computer system, comprising: instructions stored thereon for causing the computer system to locate a stream in the file, the stream associated with a plurality of sectors having a predetermined sequential order, the sectors not in the predetermined sequential order; and place the sectors of the stream in the predetermined sequential order.

8. A method to form an ordered object linking and embedding file comprising:

obtaining an object linking and embedding file;

copying a header from the object linking and embedding file to the ordered object linking and embedding file;

locating a stream in the object linking and embedding file, the stream associated with a plurality of sectors having a predetermined sequential order, the sectors not in the predetermined sequential order; and placing the sectors of the stream in the predetermined sequential order in the ordered object linking and embedding file and immediately after the header.

9. The method of claim 8, wherein the stream is an image stream.

10. The method of claim 8, wherein the object linking and embedding file comprises a FLASHPIX file.

11. The method of claim 8, wherein the object linking and embedding file comprises a plurality of streams, each stream having an ordering relation to the other streams, the method further comprising:

placing the sectors of each stream in their predetermined sequential order; and placing each stream in an order consistent with its ordering relation in the ordered object linking and embedding file.

12. The method of claim 11 further comprising updating a directory and a file allocation table of the ordered object linking and embedding file to maintain the ordered object linking and embedding file as an object linking and embedding file.

13. A program storage device, readable by a computer system, comprising: instructions stored thereon for causing the computer system to obtain an object linking and embedding file;

copy a header from the object linking and embedding file to the ordered object linking and embedding file;

locate a stream in the object linking and embedding file, the stream associated with a plurality of sectors having a predetermined sequential order, the sectors not in the predetermined sequential order; and place the sectors of the stream in the predetermined sequential order in the ordered object linking and embedding file and immediately after the header.

14. A method to progressively viewing an ordered object linking and embedding file comprising:

obtaining an ordered object linking and embedding file, the file including sequentially ordered data representing an image; and displaying the image immediately after the sequentially ordered data is received and before the remainder of the ordered object linking and embedding file is received.

15. The method of claim 14, wherein the ordered object linking and embedding file comprises a FLASHPIX file.

16. The method of claim 14, wherein obtaining comprises receiving the ordered object linking and embedding file via a byte level streaming protocol.

17. The method of claim 16, wherein the protocol is the hypertext transfer protocol.

18. A program storage device, readable by a computer system, comprising:

instructions stored thereon for causing the computer system to receive an ordered object linking and embedding file, the file including sequentially ordered data representing an image; and display the image immediately after the sequentially ordered data is received and before the remainder of the ordered object linking and embedding file is received.

19. A method to order an object linking and embedding file comprising:

locating a stream in the file, the stream associated with a plurality of sectors having a predetermined sequential order, the sectors not in the predetermined sequential order;

placing the sectors of the stream in the predetermined sequential order;

forming a sentinel having information associated with the ordered stream;

incorporating the sentinel in the file; and updating a directory and a file allocation table of the file to maintain the file as an object linking and embedding file.

20. The method of claim 19, wherein the sentinel comprises information indicating the length of the ordered stream.

21. The method of claim 19, wherein the sentinel record is placed in a location immediately after a header component of the file and the ordered stream is placed in a second location immediately after the sentinel record.

22. A program storage device, readable by a computer system, comprising:

instructions stored thereon for causing the computer system to locate a stream in the file, the stream associated with a plurality of sectors having a predetermined sequential order, the sectors not in the predetermined sequential order;

place the sectors of the stream in the predetermined sequential order; and update a directory and a file allocation table of the file to maintain the file as an object linking and embedding file.

23. The program storage device of claim 22, further comprising instructions to:

form a sentinel having information associated with the ordered stream;

incorporate the sentinel in the file; and update a directory and a file allocation table of the file to maintain the file as an object linking and embedding file.

24. A method to form an ordered object linking and embedding file comprising:

obtaining an object linking and embedding file;

copying a header from the object linking and embedding file to the ordered object linking and embedding file;

locating a stream in the object linking and embedding file, the stream associated with a plurality of sectors having a predetermined sequential order, the sectors not in the predetermined sequential order;

placing the sectors of the stream in the predetermined sequential order in the ordered object linking and embedding file and immediately after the header;

forming a sentinel record having information associated with the ordered stream; and incorporating the sentinel record in the ordered object linking and embedding file.

25. The method of claim 24, wherein the sentinel comprises information indicating the length of the ordered stream.

26. The method of claim 24, wherein the object linking and embedding file comprises a plurality of streams, each stream having an ordering relation to the other streams, the method further comprising:

placing the sectors of each stream in their predetermined sequential order;

placing each stream in an order consistent with its ordering relation in the ordered object linking and embedding file;

forming a sentinel having information associated with the ordered streams;

incorporating the sentinel in the ordered object linking and embedding file; and updating a directory and a file allocation table of the ordered object linking and embedding file to maintain the file as an object linking and embedding file.

27. The method of claim 26, wherein the sentinel is placed in a location immediately after header component of the ordered object linking and embedding file and immediately before the ordered streams.

28. A method comprising:

locating a plurality of streams in an object linking and embedding file wherein the plurality of streams are not arranged for progressive viewing; and arranging the object linking and embedding file to enable the plurality of streams to be progressively viewed.

29. The method of claim 28, further comprising:

downloading the file to a location using a byte level streaming protocol.

30. The method of claim 29, further comprising:

progressively viewing one of the plurality of streams at the location during the download.

* * * * *